(12) United States Patent
Park (10) Patent No.: US 8,278,915 B2
(45) Date of Patent: Oct. 2, 2012

(54) MINIMIZING MAGNETIC INTERFERENCE IN A VARIABLE RELUCTANCE RESOLVER

(76) Inventor: Chun Soo Park, Seoul (KR)

( * ) Notice: Subject to any disclaimer, the term of this patent is extended or adjusted under 35 U.S.C. 154(b) by 259 days.

(21) Appl. No.: 12/484,207

(22) Filed: Jun. 13, 2009

(65) Prior Publication Data

US 2010/0148763 A1  Jun. 17, 2010

(30) Foreign Application Priority Data

Dec. 15, 2008  (KR) ...................... 10-2008-00127309

(51) Int. Cl.
*G01B 7/30* (2006.01)
(52) U.S. Cl. .................................. 324/207.25
(58) Field of Classification Search .................. None
See application file for complete search history.

(56) References Cited

U.S. PATENT DOCUMENTS

| | | | | |
|---|---|---|---|---|
| 2,978,623 | A * | 4/1961 | Williams et al. | 318/727 |
| 3,439,265 | A * | 4/1969 | Strom | 324/552 |
| 2010/0156402 | A1* | 6/2010 | Straubinger et al. | 324/207.25 |

FOREIGN PATENT DOCUMENTS

| | | | |
|---|---|---|---|
| DE | 102006026543 | * | 12/2007 |
| JP | 2008-181360 A1 | | 7/2007 |
| KR | 10-2005-0062611 A1 | | 6/2005 |

* cited by examiner

*Primary Examiner* — Paresh Patel (57) ABSTRACT

A resolver apparatus and method are provided. The apparatus comprises a source generation unit for generating a uni-phase source signal to excite a resolver, wherein said source generation unit comprises a low distortion oscillator, a variable phase shifter, and a capacitive resolver driving network; and a signal output unit for generating a two-phase output signal, wherein said signal output unit comprises the resolver, a signal detector and level adjuster, an angular position measurement unit, and an angular position compensation unit. The method comprises generating a source signal to excite a resolver; transmitting the source signal through a variable phase shifter; transmitting the source signal through at least one capacitive passive element serially connected to each coil winding of the resolver; outputting a displacement signal generated by the resolver to a resolver-to-digital converter; and converting said displacement signal into a digital position using the resolver-to-digital converter.

4 Claims, 7 Drawing Sheets

MINIMIZING MAGNETIC INTERFERENCE IN A VARIABLE RELUCTANCE RESOLVER

CROSS-REFERENCE TO RELATED APPLICATIONS

Pursuant to 35 U.S.C. 119(a) and 119(d), this application claims right of priority to Korean Patent Application No. 10-2008-00127309 filed on Dec. 15, 2008, the content of which is incorporated by reference herein in its entirety.

TECHNICAL FIELD

The claimed subject matter relates generally to electromechanical systems and, more particularly, to resolver apparatus and methods for measuring the angular position of a shaft.

BACKGROUND

In motor applications, an optical encoder or a resolver may be used to determine the angular position of a shaft.

An optical encoder is a device comprising a rotating disk, a light source, and a photodetector (i.e., a light sensor). The disk, which is mounted on the shaft, has coded patterns of opaque and transparent sectors. As the disk rotates, these patterns interrupt the light projected onto the photodetector and generate a digital or pulse signal output that is used to determine the angular position of an object.

A resolver is a rotary transformer comprising a rotor and a stator with one or more windings (i.e., a coil). In response to excitation by one or more source signals, the windings output one or more sine or cosine signals (i.e., output voltages). The magnitude of the sine and cosine signals can be used to determine the angular position of a shaft inserted into the rotor.

Typically, a basic resolver is used for low resolution applications, and a multi-pole resolver is used for high resolution applications. A basic resolver houses two polarity windings in the stator such that the angular position of the shaft is equivalent to the mechanical angle of the stator. A multi-pole resolver houses more than two pole windings in the stator and thus provides more accuracy than a basic resolver.

Unfortunately, existing multi-pole resolvers fail to provide the same accuracy as an optical encoder. In existing multi-pole resolvers, as the rotation of the rotor increases in speed, the magnetic flux around the rotor and the windings distorts the sine and cosine output signals, which decreases the accuracy of angular position measurements.

SUMMARY

The present disclosure is directed to minimizing magnetic interference in a variable reluctance resolver.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a resolver apparatus is provided. The apparatus comprises a source generation unit for generating a uni-phase source signal to excite a resolver, wherein said source generation unit comprises a low distortion oscillator, a variable phase shifter, and a capacitive resolver driving network; and a signal output unit for generating a two-phase output signal, wherein said signal output unit comprises the resolver, a signal detector and level adjuster, an angular position measurement unit, and an angular position compensation unit.

In accordance with another embodiment, a resolver signal processing method is provided. The method comprises generating a source signal to excite a resolver; transmitting the source signal through a variable phase shifter; transmitting the source signal through at least one capacitive passive element serially connected to each coil winding of the resolver; outputting a displacement signal generated by the resolver to a resolver-to-digital converter; and converting said displacement signal into a digital position using the resolver-to-digital converter.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
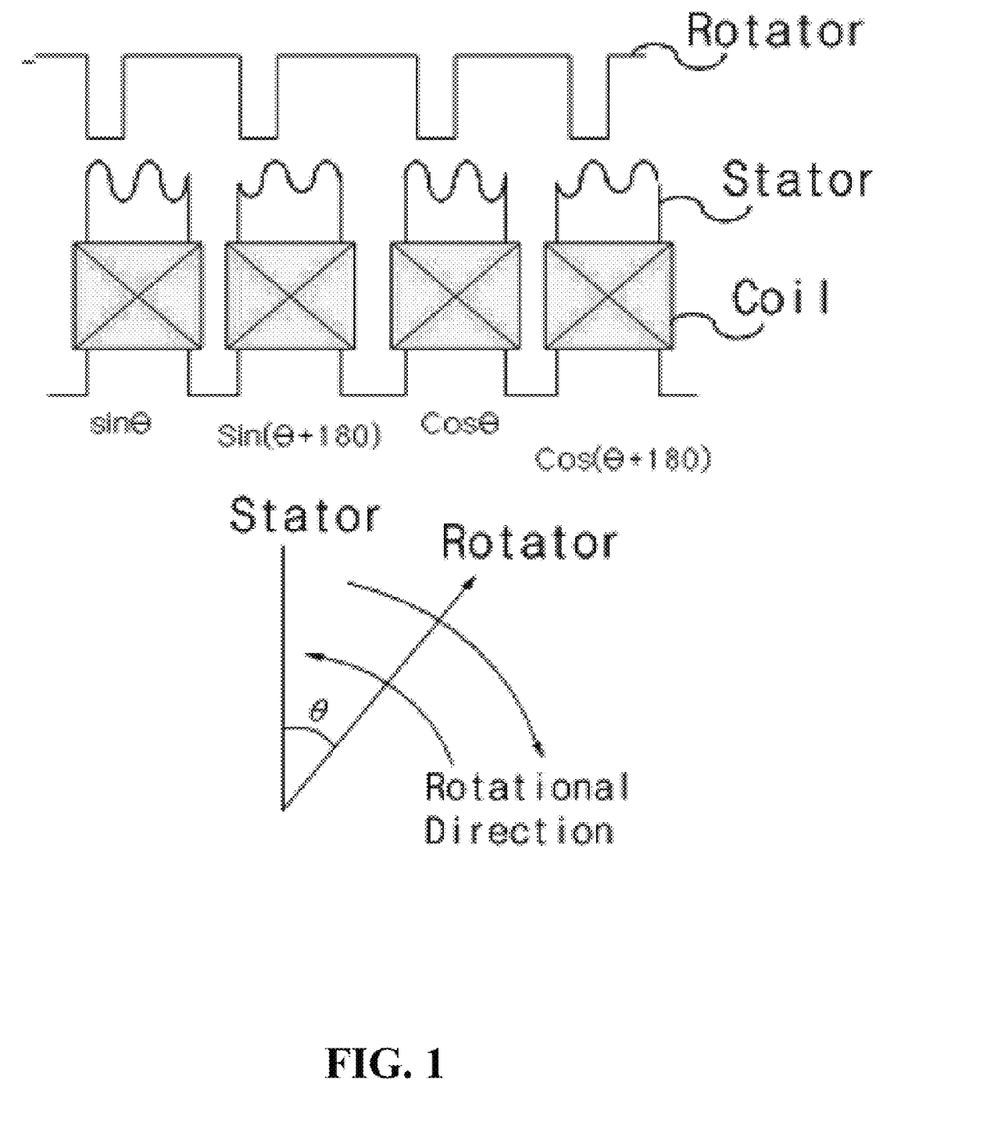
FIG. 1 illustrates an exemplary multi-pole resolver, in accordance with one or more embodiments.
Figure 6:
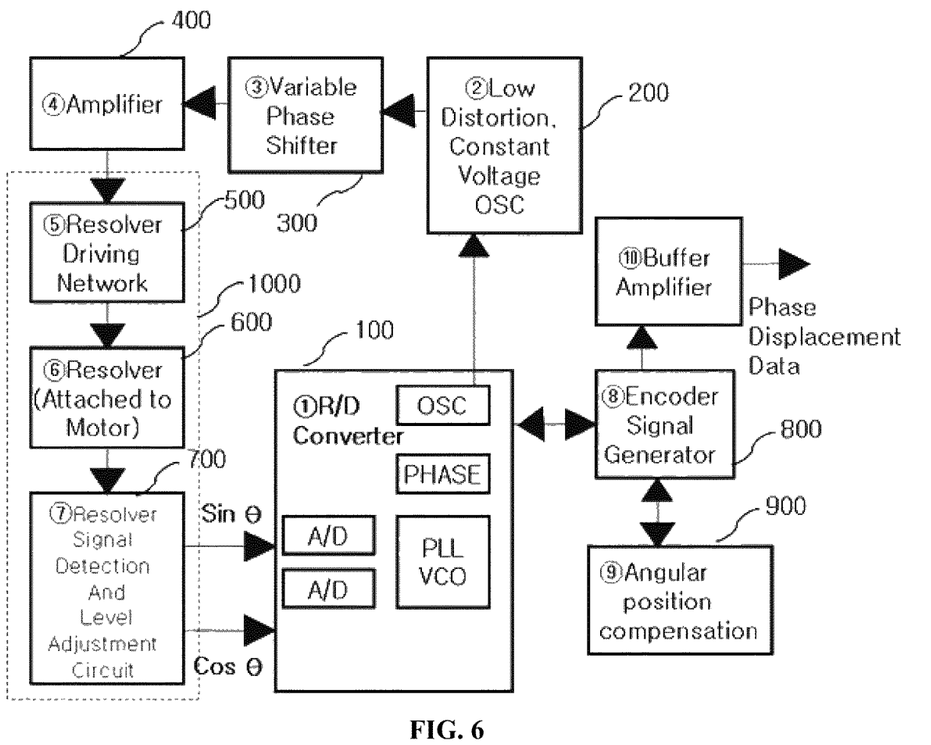
FIG. 6 is a block diagram of an exemplary apparatus comprising a uni-phase excitation, two-phase output multi-pole resolver, in accordance with one embodiment.

Referring to FIG. 1, in accordance with one embodiment, an exemplary multi-pole resolver comprises a rotor, a stator, and a coil with two or more stator windings. In one implementation, the resolver may be a variable reluctance (VR) resolver. Each stator winding in the resolver 100 in FIG. 6 is associated with one or more sine or cosine signals (e.g., Sin θ, Sin (θ+180), Cos θ, Cos (θ+180)). Excitation by a uni-phase or two-phase source signal may induce current to flow through the stator windings and cause the resolver to output a two-phase or uni-phase signal, respectively.

Figure 2:
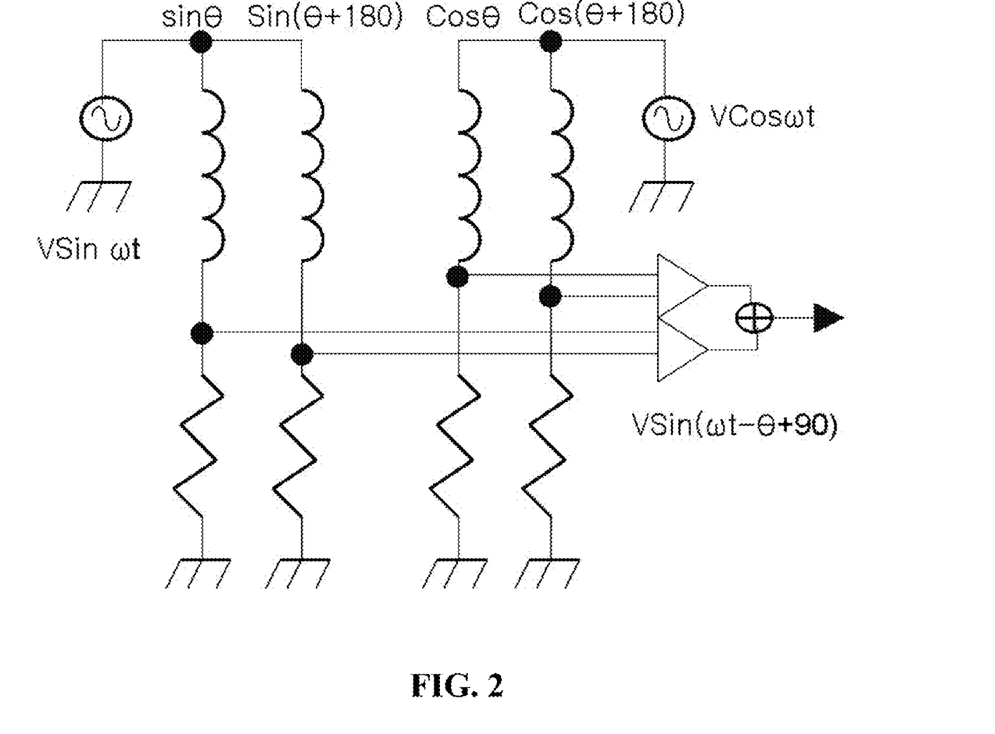
FIG. 2 is a circuit diagram of an exemplary two-phase excitation, uni-phase output resolver.

Referring to FIG. 2, a circuit diagram of an exemplary two-phase excitation, uni-phase output multi-pole resolver. The waveform of the signal outputted by the resolver may be expressed as follows:

$$(V\sin\omega t \times \sin\theta) - (V\sin\omega t \times \sin(\theta + 180)) = 2 \cdot V\sin\omega t \times \sin\theta$$

$$(V\cos\omega t \times \cos\theta) - (V\cos\omega t \times \cos(\theta + 180)) = 2 \cdot V\cos\omega t \times \cos\theta$$

$$Vout = 2 \cdot V\sin\omega t \times \sin\theta + 2 \cdot V\cos\omega t \times \cos\theta$$
$$= 2 \cdot V\cos(\omega t - \theta)$$
$$= 2 \cdot V\sin(\omega t - \theta + 90)$$

However, the uni-phase sinusoidal signal waveform sin (wt−θ+90) of the output signal prevents the use of a general purpose resolver-to-digital (R/D) converter since a general purpose R/D converter needs both sine and cosine reference phases to process the displacement signal θ. To measure the phase rotation accurately from the uni-phase sinusoidal signal, a very sensitive phase discriminator is required to track the phase of the output signals. The other drawback in angular position measurement from the uni-phase sinusoidal signal arises from the inherently existing non-linearity of the uni-phase sinusoidal signal itself, which essentially leads to increased measurement error even for a very fine displacement. The non-linearity of coil inductance also contributes to increased error when the resolver rotates at high speed.

Figure 3:
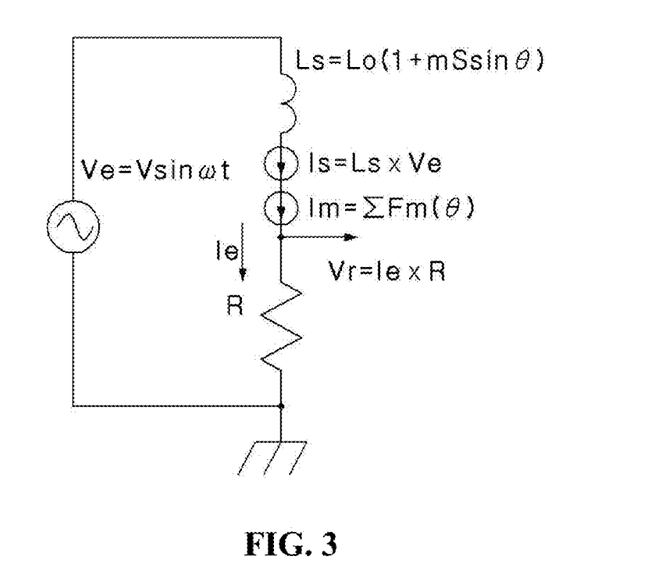
FIG. 3 is a circuit diagram that is electrically equivalent to the circuit diagram provided in FIG. 2.

Referring to FIG. 3, a circuit diagram that electrically equivalent to the circuit diagram shown in FIG. 2 is provided to explain the two-phase excitation, uni-phase output resolver in more detail. As the shaft rotates with θ, two fundamental components are considered: the inductance component (Ls) which varies sinusoidally and the dependent current source component (Is) which is proportional to the multiplication of inductance component (Ls) and the applied voltage (Ve). The dependent current source (Im) induced by the magnetic flux Fm(θ) that varies with the magnetic interference is also considered.

The resulting electrical characteristic of uni-phase sinusoidal wave resolver is also a function of driving source (Ve) frequency and non-linearly dependent on time-varying inductance which includes the magnetic interference. The output current (Ie) shown in FIG. 3 may be expressed as provided in Equations (1) through (3) below:

$$Ie = Is + Im + \frac{1}{\sqrt{(R^2 + \omega^2 Ls^2)}} \sin(\omega t + \Phi), \quad (1)$$

$$Ls = Lo(1 + m \cdot \sin\theta) = Lo(1 + m \cdot \sin\Omega t), \quad (2)$$

$$\Phi = \arctan(-\omega Ls/R), \quad (3)$$

Ω: Angular Speed of Revolver Rotation Angleθ, (rad/sec)

Ls denotes the inductance of resolver coil, Lo denotes the intrinsic inductance of resolver coil, Im denotes the sum of all currents induced by interference flux, Ie denotes the resolver driving current (output voltage for the case of VR type), m denotes the ratio between the intrinsic inductance and the flux changes, R denotes the resistance to detect the output voltage, θ denotes the rotation angle of resolver, Fm(θ) denotes the induced current, and Ve denotes the applied voltage to resolver.

Equations (1), (2), and (3) show that even though the dependency of amplitude variation of the source signal is minimized by increasing ($R^2+\omega^2Ls^2$), the amplitude and phase of the source signal varies as the resolver inductance varies, especially due to the time varying nature of magnetic interference.

Figure 4:
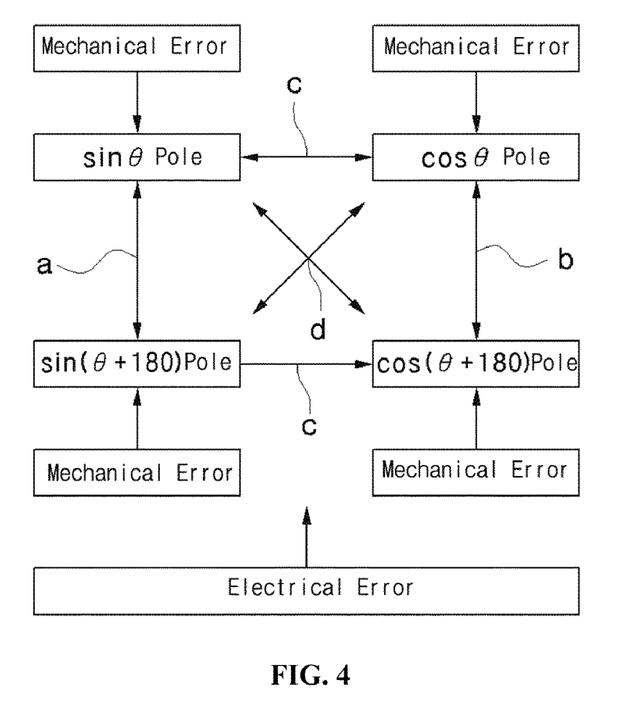
FIG. 4 illustrates the distortion caused by magnetic interference.

FIG. 4 illustrates the distortion caused by magnetic interference. As described above, the complicated and non-linear characteristic of magnetic interference in a resolver excited by a uni-phase sinusoidal wave may be attributed to two factors: self interference within the same poles and the cross interference between orthogonal poles. Mechanical distortion may also be added on top of magnetic interference.

Self interference comprises: the interference between Sin θ pole and Sin (θ+180) pole, which is a function of $K^2$*Sin θ*Sin (θ+180); the interference between Cos θ pole and Cos (θ+180) pole, which is a function of $K^2$*Cos θ*Cos (θ+180). Cross-interference comprises: the interference between Sin θ pole and Cos θ pole, which is a function of $K^2$*Sin θ*Cos θ; the interference between Sin (θ+180) pole and Cos (θ+180) pole, which is a function of ($K^2$*Sin (θ+180)*Cos (θ+180)); the interference between Sin θ pole and Cos (θ+180) pole, which is a function of $K^2$*Sin θ*Cos (θ+180); and the interference between Sin (θ+180) pole and Cos θ pole, which is a function of $K^2$*Sin (θ+180)*Cos θ.

The above analysis is based on up to 2nd harmonics, however, and, depending on the direction of windings, higher order harmonics may be involved in practice. Therefore, the generalized form of interference current due to the magnetic flux interference (Im) is expressed as follows as provided below. K=ζ*m (ζ is the magnetic flux coupling ratio; m is the coil inductance change ratio).

Interference current through Sin θ and Sin (θ+180) pole may be expressed as follows:

$$Im = \text{2nd harmonic interference} + \quad (4)$$
$$\text{3rd harmonic interference} + \ldots$$
$$= (K^2 * \sin^2\theta) + (K^2 * \sin\theta * \cos\theta) + (K^3 * \sin^3\theta) + \ldots,$$

Interference current through Cos θ and Cos (θ+180) pole may be expressed as follows:

$$Im = (K^2*\cos^2\theta) + (K^2*\sin\theta*\cos\theta) + (K^3*\cos^3\theta) + \ldots \quad (5)$$

In Equations (4) and (5), K is the rate of flux change as the resolver rotates, which is in the usual range of 0.1~0.3, so that terms beyond 2nd order of K can be neglected. If the windings are wired in such a way as to minimize the interference between orthogonal poles, the interference induced current by sine winding and cosine winding respectively may be simplified as follows:

$$Im = (K^2 * \mathrm{Sin}^2 \theta), \quad (6)$$

$$Im = (K^2 * \mathrm{Cos}^2 \theta), \quad (7)$$

Assuming magnetic flux coupling between poles of 100% (no leakage inductance), K becomes m. In this case, the interference induced current by sine winding and cosine winding respectively may be expressed as follows:

$$Im = (m^2 * \mathrm{Sin}^2 \theta), \quad (8)$$

$$Im = (m^2 * \mathrm{Cos}^2 \theta), \quad (9)$$

Above Equation (1) applies when resolver is not rotating, however, as resolver rotates with angular speed of Ω, the resolver inductance (Ls) becomes a time varying function, and the phase of the source signal, φ, becomes a non-linear time varying function. Especially when R≦Ls, this phenomenon is more significant so that resolver output voltage is heavily dependent on Ω, thereby phase rotation measurement error will grow.

Figure 5:
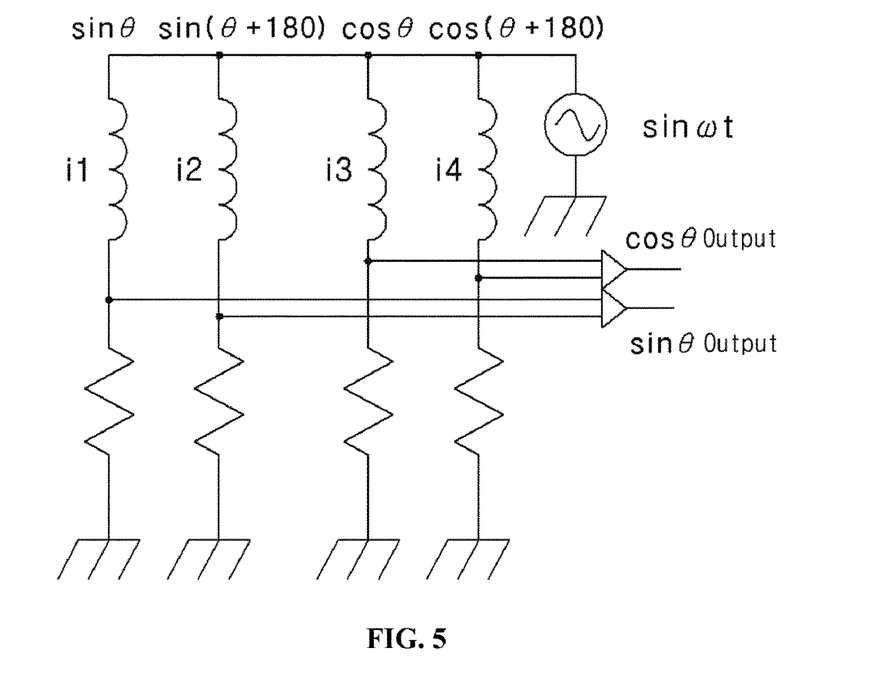
FIG. 5 is a circuit diagram of an exemplary uni-phase excitation, two-phase output resolver.

Referring to FIG. 5, an exemplary uni-phase excitation, two-phase output resolver is provided in accordance with one embodiment, in which driving waveforms are wired in such a way as to minimize the magnetic induction between orthogonal poles while maximizing the magnetic induction between the same poles. The currents i1, i2, i3, and i4 through each pole, Sin θ, Sin (θ+180), Cos θ, and Cos (θ+180), respectively, may be determined using Equation (1) as provided below in Equations (10) through (13).

The current through Sin θ may be expressed as follows:

$$i1 = \left[ \begin{array}{c} Lo(1 + m\mathrm{Sin}\theta) + \\ m^2 \mathrm{Sin}^2\theta + \dfrac{1}{\sqrt{(R^2 + \omega^2 Ls^2)}} \end{array} \right] \mathrm{Sin}(\omega t + \Phi), \quad (10)$$

Applying Sin (θ+180)=−Sin θ, the current through Sin (θ+180) may be express as follows:

$$i2 = \left[ \dfrac{Lo(1 - m\mathrm{Sin}\theta) - m^2\mathrm{Sin}^2\theta - \dfrac{1}{\sqrt{(R^2 + \omega^2 Ls^2)}}}{} \right] \mathrm{Sin}(\omega t + \Phi), \quad (11)$$

The current through Cos θ may be expressed as follows:

$$i3 = \left[ \dfrac{Lo(1 + m\mathrm{Cos}\theta) + m^2\mathrm{Cos}^2\theta + \dfrac{1}{\sqrt{(R^2 + \omega^2 Lc^2)}}}{} \right] \mathrm{Sin}(\omega t + \Phi), \quad (12)$$

Applying Cos (θ+180)=−Cos θ, the current through Cos (θ+180) may be expressed as follows:

$$i4 = \left[ \dfrac{Lo(1 - m\mathrm{Cos}\theta) - m^2\mathrm{Cos}^2\theta - \dfrac{1}{\sqrt{(R^2 + \omega^2 Lc^2)}}}{} \right] \mathrm{Sin}(\omega t + \Phi), \quad (13)$$

The Sin θ and Cos θ waveform of a uni-phase excitation, two-phase output resolver is distorted significantly compared to the ideal waveform. For this reason, many existing resolvers are two-phase excitation, uni-phase output resolvers, as shown in FIG. 3. However, the magnetic interference in a uni-phase excitation, two-phase output multi-pole variable reluctance resolver may be minimized such that a general purpose R/D converter can be readily and economically utilized to process a two-phase output signal.

Systems and methods for obtaining near-ideal Sin θ and Cos θ waveforms in a uni-phase excitation, two-phase output multi-pole variable reluctance resolver are provided below.

Referring to FIG. 6, an exemplary uni-phase excitation, two-phase output resolver apparatus is provided in accordance with one embodiment. A voltage oscillator 200 may provide a source signal to excite the stator windings in a resolver 600 attached onto a motor. The signal may be processed by the variable phase shifter 300 and the amplifier 400 prior to arriving at the output signal stabilizer 1000. Once the signal arrives at the output signal stabilizer 1000, the signal may pass through the capacitive resolver driving network 500 prior to reaching the resolver 600.

Figure 7:
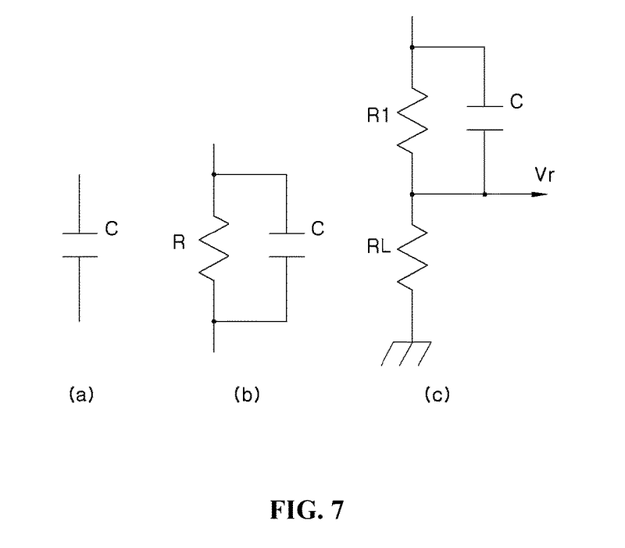
FIGS. 7(a) and 7(b) are circuit diagrams of an exemplary resolver driving network, in accordance with one embodiment.
FIG. 7(c) is a circuit diagram of an exemplary resolver signal level detector and adjuster, in accordance with one embodiment.

The capacitive resolver driving network 500 may be implemented as a capacitor (C) network or a resistor-capacitor (R-C) network as shown in FIGS. 7(a) and 7(b), respectively. A network including variable resistors to implement a resolver signal detector and adjuster 700 may be added to the output signal stabilizer 1000, as shown in FIG. 7(c). The resolver signal detector and adjuster 700 may output sine and cosine signals to a resolver-to-digital (R/D) converter 100. The R/D converter 100 may be implemented using commercially available monolithic integrated circuits (ICs).

Referring to FIG. 7(a), in accordance with one embodiment, a capacitive passive element (e.g., a capacitor) may be serially connected to each coil winding of the resolver 600. Inserting the capacitive passive element, however, may cause phase shift between the R/D converter 100 phase reference and the R/D converter 100 input signal. In accordance with one embodiment, the variable phase shifter 300 may be implemented to compensate for the above phase shift.

Referring to FIG. 7(b), in accordance with one embodiment, a resistive passive element (e.g., a resistor) may be connected in parallel to a capacitive passive element to control the amplitude of an output signal in an effort to improve overall performance.

Referring back to FIG. 6, in accordance with one embodiment, the R/D converter 100 may measure angular position from output signals provided by the resolver 600 and make more reliable position data using an encoder signal generator 800 and angular position compensator 900 and a buffer amplifier. The encoder signal generator 800 may be implemented using a general purpose processor or a digital signal processor.

The angular position compensator 900 may compensate for angular position measurement error as well as any additional mechanical/electrical error by applying a linear interpolation or a direct addition or subtraction method. The position error reference data used by the angular position compensator 900 may be stored in Flash memory, ROM, or EEPROM, or other type of memory.

Figure 8:
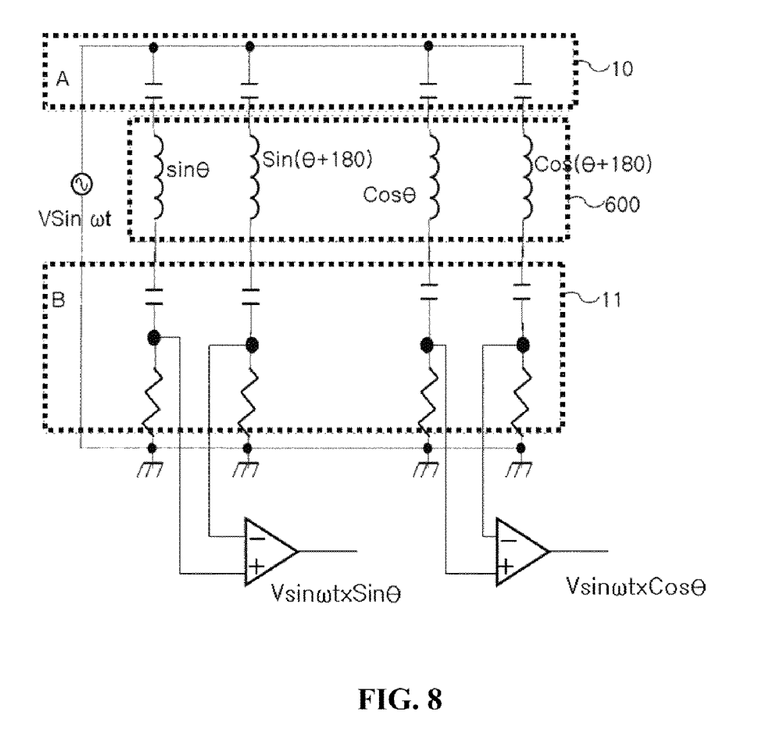
FIG. 8 is a circuit diagram of an exemplary resolver output signal stabilizer including a capacitive resolver driving network (C-network), in accordance with one embodiment.

Referring to FIG. 8, a circuit diagram of an exemplary resolver output signal stabilizer 1000 is provided in accordance with one embodiment. The resolver output signal stabilizer implements a capacitive resolver driving network using a C network, but it is possible to implement the capacitive resolver driving network using an R-C network as provided earlier.

Figure 9:
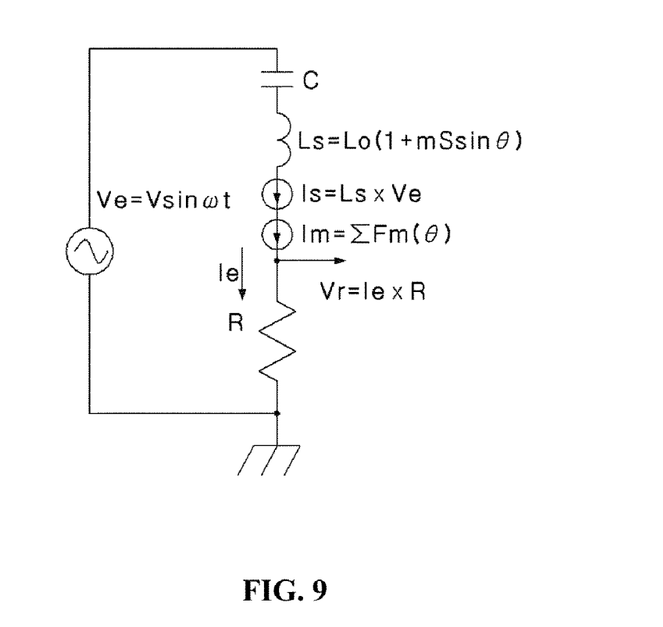
FIG. 9 is a circuit diagram that is electrically equivalent to the circuit diagram provided in FIG. 8, in accordance with one embodiment.

An output signal may processed by the resolver output signal stabilizer according to the electrically equivalent circuit shown in FIG. 9. The following equations may respectively be derived from Equations (1), (2), and (3):

$$Ie = Is + Im + \frac{1}{\sqrt{R^2 + \left(\omega Ls - \frac{1}{\omega C}\right)^2}} \sin(\omega t + \Phi c) \quad (14)$$

$$Ls = Lo(1 + m \cdot \sin\theta) = Lo(1 + m \cdot \sin\Omega t) \quad (15)$$

$$\Phi c = \arctan\left(-\frac{\omega Ls - \frac{1}{\omega C}}{R}\right) \quad (16)$$

Ω: Angular Speed of Reolver Rotation Angle θ, (rad/sec)

Ls denotes the inductance of the coil, Lo denotes the intrinsic inductance of the coil, Im denotes the sum of all currents induced by interference flux, Ie denotes the resolver driving current (resolver output voltage for VR type resolver), m denotes the ratio between the intrinsic inductance and the flux changes, R denotes the resistance to detect the output voltage, θ denotes the rotation angle of resolver, Fm(θ) denotes the induced current, Ve denotes the applied voltage to resolver, and C denotes the capacitance of the passive capacitive element in the capacitive resolver driving network.

Equations (3), (4), and (5) and Equations (14), (15), and (16) express the steady state response for a sinusoidal AC current, in which (ωLs−(1/ωC)) in Equations (14) and (16) is the non-linear and time-varying component as the resolver rotates at angular speed ω. The angular speed ω of the source signal is in the range of 10 kHz, while the rotating angular speed Ω is in the range of a few hundred Hz even for high speed applications. Therefore Ω<<ω, ωLs−(1/ωC) in Equations (14), (16) may be respectively rewritten in terms of the angular speed of ω and Ω as follows:

$$\omega Ls - 1/\omega C \approx \omega Ls, \quad (17)$$

$$\Omega Ls - 1/\Omega C \approx -(1/\Omega C), \quad (18)$$

If ωLs−(1/ωC) in Equation (14) and (16) is replaced by Equations (17) and (18), then Equations (14) and (16) may have the same form as Equations (1) and (3), respectively, however 90° phase difference in angular speed variation exists due to the capacitive passive element C.

The 90° phase difference calculated from the above derivation indicates that there is 90° phase difference between the inductance variation by resolver rotation and current variation by driving source signal. Since the current induced by the interference flux is caused by the current of driving signal, the interference current will be the sum of currents having 90° phase difference. Therefore, when capacitive passive element C is inserted, Equations (8) and (9) may be expressed as provided below in Equations (19) and (20).

The interference induced current by sine winding and cosine winding may be respectively expressed as follows:

$$Im = (m^2 * \sin\theta * \sin(\theta + 90)), \quad (19)$$

$$Im = (m^2 * \cos\theta * \cos(\theta + 90)), \quad (20)$$

Using the above equations, the currents i1, i2, i3, and i4 through each pole, Sin θ, Sin (θ+180), Cos θ, and Cos (θ+180) as shown in Equations (10), (11), (12), and (13), respectively, may be simplified as provided below in Equations (21) through (24).

The current through Sin θ may be expressed as follows:

$$i1 = Lo(1 + m \sin\theta) + m^2 \sin\theta * \sin(\theta + 180), \quad (21)$$

The current through Sin (θ+180) may be expressed as follows:

$$i2 = Lo(1 - m \sin\theta) + m^2 \sin(180 + \theta) * \sin\theta, \quad (22)$$

The current through Cos θ may be expressed as follows:

$$i3 = Lo(1 + m \cos\theta) + m^2 \cos\theta * \cos(\theta + 180), \quad (23)$$

The current through Cos (θ+180) may be expressed as follows:

$$i4 = Lo(1 - m \cos\theta) + m^2 \cos(\theta + 180) * \cos\theta, \quad (24)$$

When capacitive passive element C is inserted, in accordance with one embodiment, Equations (21), (22), (23), and (24) may be rewritten as provided below in Equations (25) through (28).

The current through Sin θ when capacitive passive element C is inserted may be expressed as follows:

$$i1 = Lo(1 + m \sin\theta) + m^2 \sin\theta * \sin(\theta + 180 + 90), \quad (25)$$

The current through Sin (θ+180) when capacitive passive element C is inserted may be expressed as follows:

$$i2 = Lo(1 - m \sin\theta) + m^2 \sin(180 + \theta) * \sin(\theta + 90), \quad (26)$$

The current through Cos θ when capacitive passive element C is inserted may be expressed as follows:

$$i3 = Lo(1 + m \cos\theta) + m^2 \cos\theta * \cos(\theta + 180 + 90), \quad (27)$$

The current through Cos (θ+180) when capacitive passive element C is inserted may be expressed as follows:

$$i4 = Lo(1 - m \cos\theta) + m^2 \cos(\theta + 180) * \cos(\theta + 90), \quad (28)$$

FIGS. 10(a) and 10(b) compare the waveforms of one embodiment with ideal waveforms and waveforms from output of an existing resolver. FIGS. 10(a) and 10(b) show graphs of sinusoidal waveforms (solid sharp line) both for Sin θ and Cos θ when Lo=1 and m=0.15 in above equation on top of the ideal sinusoidal waveform (solid bold line), in which the dotted line waveform is the one obtained by the conventional method of without capacitive passive element. It can be clearly seen that the Sin θ or Cos θ waveform (solid sharp line) obtained after connecting capacitive passive element in accordance with the claimed subject matter is very close to the corresponding ideal waveform (solid bold line), while conventional Sin θ or Cos θ waveform (dotted line) is distorted from the ideal waveform.

Figure 11:
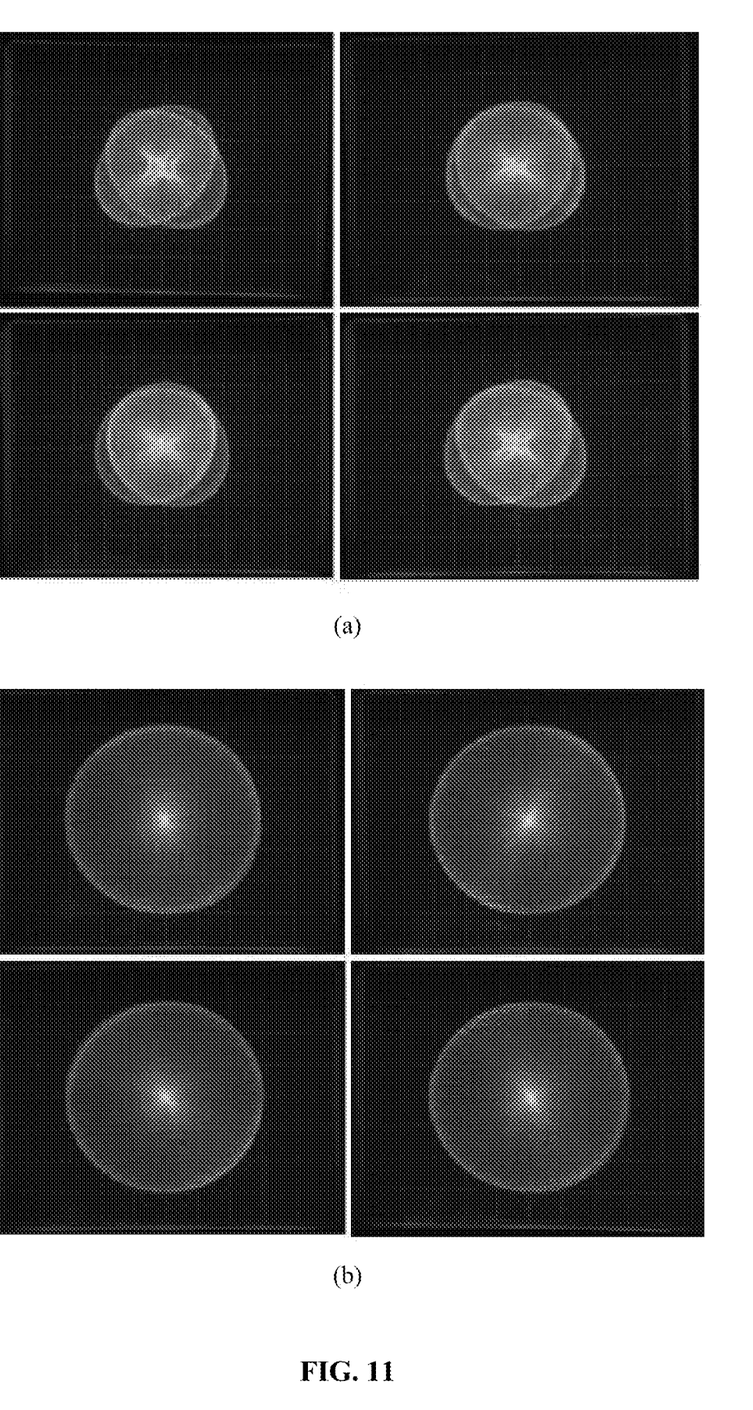
FIGS. 11(a) and 11(b) are Lissajous graphs of output waveforms before installing a capacitive resolver driving network and after installing a capacitive resolver driving network, in accordance with one embodiment.

In FIGS. 11(a) and 11(b), Lissajous graphs are provided to illustrate the effectiveness of the claimed subject matter. FIG. 11(a) shows the output of a uni-phase excitation, two-phase output resolver apparatus without an R-C driving network (i.e., an existing resolver apparatus), while FIG. 11(b) shows the output of a uni-phase excitation, two-phase output multi-pole resolver apparatus comprising an R-C driving network (i.e., a resolver apparatus in accordance with the claimed subject matter).

In FIG. 11(a), the path traced by Sin θ and Cos θ along the x-axis and y-axis, respectively, is severely distorted. In FIG. 11(b), however, the distortion is almost entirely removed while the orthogonality between Sin θ and Cos θ still holds. Therefore, FIGS. 11(a) and 11(b) show that the resolver apparatus in accordance with the claimed subject matter is a significant improvement over the existing resolver apparatus.

Figure 10:
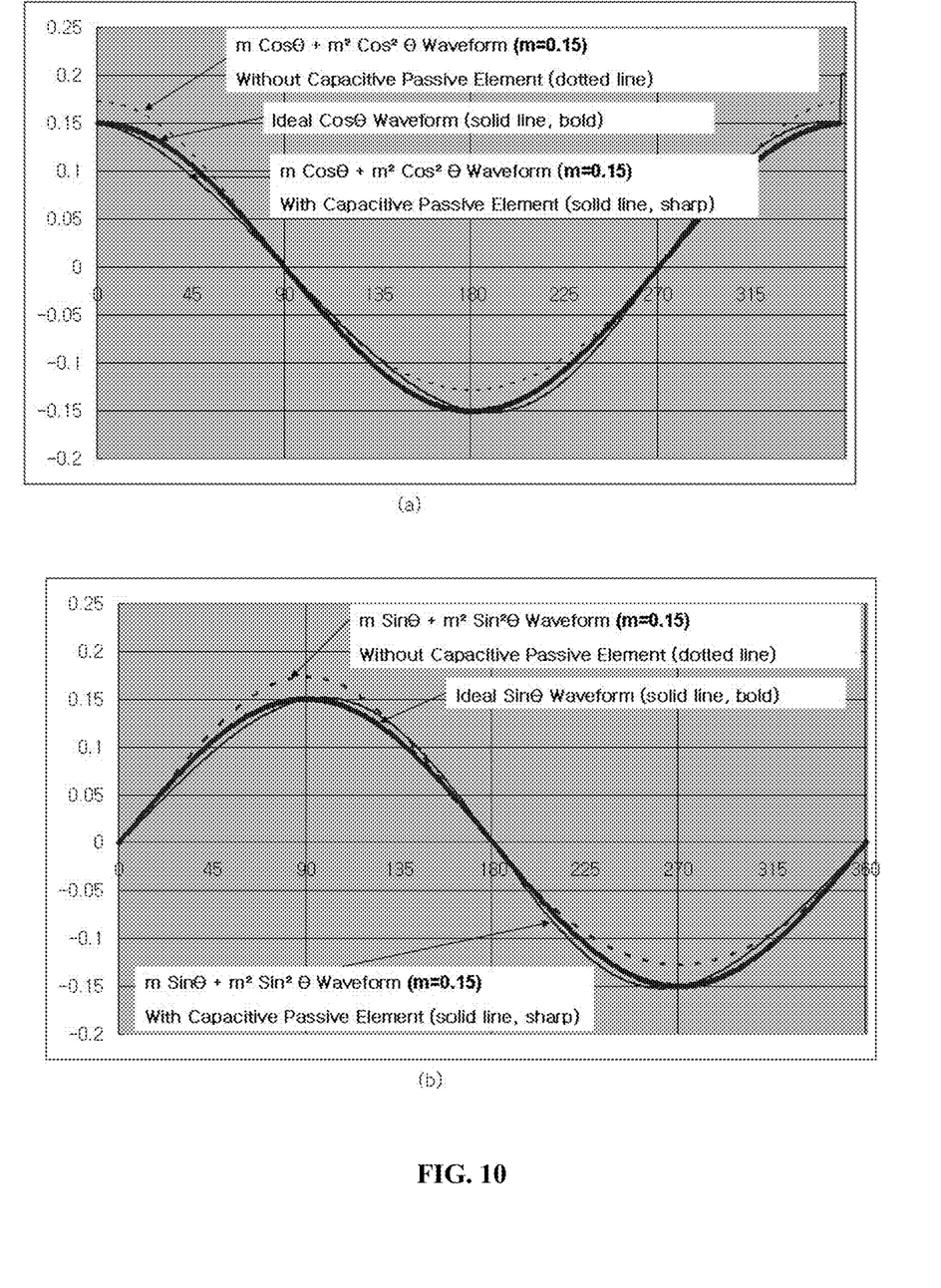
FIGS. 10(a) and 10(b) are graphs comparing the waveforms for cosine and sine signals, respectively, outputted by an ideal resolver, an existing resolver, an exemplary resolver, in accordance with one embodiment.

Advantageously, the resolver apparatus and methods provided in accordance with one or more embodiments of the claimed subject matter significantly reduce magnetic interference by directly connecting capacitive passive elements to each winding of a resolver. This is possible, in part, because the angular speed ω of the source signal is much bigger than the rotator angular speed Ω. Additionally, the capacitance of the passive capacitive element in resolver driving network and the intrinsic inductance Lo of resolver coil react at different angular speeds; that is, Lo reacts dominantly at ω, while C reacts dominantly at Ω. Moreover, the phase of the current at C is 90° apart from that of the current at Lo, such that magnetic interference is orthogonal. Due to this orthogonal property, the magnetic interference in the resolver is greatly reduced as shown in FIGS. 10(*a*), 10(*b*), and 11(*b*). Even the minor phase error shown in FIGS. 10(*a*) or 10(*b*) may be easily compensated by the angular position compensator 900 provided above with reference to FIG. 6.

In addition to achieving high accuracy, the resolver apparatus and methods provided in accordance with one or more embodiments of the claimed subject matter also achieve high resolution. For example, a resolver with 100 poles, in accordance with one embodiment, may achieve as many as 6,553,600 divisions per revolution using the methods provided above, which is more than 65,000 times the number of poles. That is, the resolver may achieve a multiplication factor of more than 65,000. Compared with the less than 5,000 multiplication factor achieved by existing practical interpolation conversion methods, the resolver in accordance with the claimed subject matter improves resolution by at least more than an order of magnitude.

Further, the resolver apparatus and methods provided in accordance with one or more embodiments of the claimed subject matter achieve improved performance at an economic cost. For example, a resolver apparatus may be implemented using a cost-effective general purpose R/D converter that is configured for high-speed hardware processing, which may reduce the amount of software processing time required to determine a digital position.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A variable reluctance resolver signal processing method for minimizing magnetic interference, the method comprising:
    driving a uni-phase source signal through at least one capacitive passive element of a resolver,
    wherein the uni-phase source signal is less than 50,000 hertz,
    wherein the at least one capacitive passive element is serially connected to each sine and cosine coil winding of the resolver,
    wherein the driving causes a frequency-dependent reactance phase property of the at least one capacitive passive element on each sine and cosine coil winding of the resolver;
    phase shifting the resolver rotation current on each sine and cosine coil winding of the resolver by 90 degrees,
    wherein the frequency of the resolver rotation current is less than a few hundred hertz,
    wherein the phase shifting consequently reduces magnetic interference by mutual and interactive phase cancelation of induced magnetic flux on each sine and cosine coil winding of the resolver; and
    outputting a low distortion sine and cosine signal from the resolver.

2. A multi-pole variable reluctance resolver apparatus, the apparatus comprising:
    a capacitive resolver driving network,
    wherein a uni-phase source signal is driven through at least one capacitive passive element of a resolver,
    wherein the uni-phase source signal is less than 50,000 hertz,
    wherein the at least one capacitive passive element is serially connected to each sine and cosine coil winding of the resolver,
    wherein the driving causes a frequency-dependent reactance phase property of the at least one capacitive passive element on each sine and cosine coil winding of the resolver,
    wherein the resolver rotation current on each sine and cosine coil winding of the resolver is phase shifted by 90 degrees,
    wherein the frequency of the resolver rotation current is less than a few hundred hertz,
    wherein the phase shifting consequently reduces magnetic interference by mutual and interactive phase cancelation of induced magnetic flux on each sine and cosine coil winding of the resolver; and
    a signal output unit for outputting a sine and cosine angular position signal,
    wherein the signal output unit comprises the resolver, a resistor and level adjuster, and an angular position measurement unit that uses a general purpose resolver-to-digital converter.

3. The resolver apparatus according to claim 2, wherein a resistive passive element is inserted serially with the at least one capacitive passive element to sense a rotation current of the resolver.

4. The resolver apparatus according to claim 2, wherein a resistive passive element is inserted in parallel with the at least one capacitive passive element to adjust the amplitude and phase of resolver driving current.

* * * * *